US007457878B1

(12) United States Patent
Mathiske et al.

(10) Patent No.: US 7,457,878 B1
(45) Date of Patent: Nov. 25, 2008

(54) LOW-LATENCY ULTRA-THIN-CLIENT INFRASTRUCTURE

(75) Inventors: Bernd J. Mathiske, Cupertino, CA (US); William R. Bush, Atherton, CA (US); Nachiappan Periakaruppan, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 765 days.

(21) Appl. No.: 10/983,254

(22) Filed: Nov. 4, 2004

(51) Int. Cl.
*G06F 15/13* (2006.01)

(52) U.S. Cl. ................. 709/227; 709/228; 709/229; 726/19; 726/15

(58) Field of Classification Search ............ 709/227, 709/228, 229; 726/7, 15, 19
See application file for complete search history.

(56) References Cited

U.S. PATENT DOCUMENTS

| 6,085,247 | A * | 7/2000 | Parsons et al. ............ 709/227 |
| 6,269,402 | B1 * | 7/2001 | Lin et al. ................ 709/227 |
| 7,050,961 | B1 * | 5/2006 | Lee et al. ................ 703/22 |
| 7,146,636 | B2 * | 12/2006 | Crosbie ................... 726/7 |

2004/0054717 A1 * 3/2004 Aubry et al. ............... 709/203

* cited by examiner

*Primary Examiner*—Jinsong Hu
(74) *Attorney, Agent, or Firm*—Park, Vaughan & Fleming LLP

(57) ABSTRACT

One embodiment of the present invention provides a system that supports low-latency session-mobility for an ultra-thin-client. During system operation, an ultra-thin-client sends a location-identifier to a Connection Assignment Server (CAS), which facilitates communication with a user-interface (UI) server, wherein the location-identifier specifies the current location of the ultra-thin-client. Next, the ultra-thin-client receives the address of a local UI-server from the CAS, wherein the CAS selects the local UI-server based on the location-identifier. The ultra-thin-client then sends a user-session identifier to the local UI-server. This allows the local UI-server to retrieve a user-session-image for a user-session from a user-session-image repository. Note that, before moving to the current location, the ultra-thin-client was previously communicating with a remote UI-server, which stored the user-session-image in the user-session-image repository. Next, the ultra-thin-client establishes a user-session connection with the local UI-server. In this way, the system enables the ultra-thin-client to resume the user-session through the local UI-server. Note that the system reduces the delay experienced by the user because it enables the ultra-thin-client to carry on the user-session with the local UI-server instead of the remote UI-server.

24 Claims, 3 Drawing Sheets

LOW-LATENCY ULTRA-THIN-CLIENT INFRASTRUCTURE

FIELD OF THE INVENTION

The present invention relates to client-server computing.

BACKGROUND

A large portion of the success of information technology (IT) can be attributed to a single computing paradigm: client-server computing. In client-server computing, a client is typically a low-cost computing device that enables users to perform computing tasks on a remote server. The server, on the other hand, is typically a costly computer that is capable of performing complex computational tasks. The advantage obtained by coupling the powerful computing ability of a server with the cost savings of multiple low-cost clients is the main reason behind the success of client-server computing.

Unfortunately, over time, the clients in most client-server architectures were replaced by costly workstations. While these workstations interacted with back-end applications, such as large, server-resident databases, they were not true "clients" at all. Rather, they were clients that also had to perform a great deal of local computing.

This trend in client-server computing diminished the main advantage of the client-server paradigm by requiring clients to have expensive hardware and software components.

Recently, the concept of an ultra-thin-client was introduced, which has lately been gaining widespread popularity. For example, an ultra-thin-client can include a monitor, a keyboard, a mouse, and a built-in smart card reader. Ultra-thin-clients provide users with seamless access to all the applications and utilities they normally use on their workstations or PCs. The actual computing, however, is performed on one or more user-interface (UI) servers.

Note that, the ultra-thin-client only needs enough memory and computing power to recognize keystrokes and mouse events and to display pixel data received from the UI-server. As a result, an ultra-thin-client frees the desktop system from having to maintain local applications and files. Moreover, in contrast to workstations, ultra-thin-clients do not have to be administered individually. Hence, system administration is drastically simplified. In addition, system administrators are freed from monotonous and error-prone tasks, such as loading software updates on dozens or hundreds of individual workstations.

In a parallel development, the rapid proliferation of broadband networks and the ever-increasing popularity of mobile computing have made it possible to remotely access corporate networks from customer sites, hotels, and airport kiosks.

Session mobility takes remote access to the next level: it allows users to access their files, their applications, and their work from virtually anywhere.

Today, session mobility is no longer a luxury—it is quickly becoming a business necessity. Furthermore, as corporations continue their relentless march towards globalization, they are requiring session mobility to work over increasingly larger distances.

Note that, an ultra-thin-client must have a low latency, i.e., the latency between the user's input and the system's response must be very small. Otherwise, the ultra-thin-client will have an abysmal performance.

Unfortunately, it is impossible to support low-latency session-mobility over large distances in an ultra-thin-client based architecture. Note that, if the distance between the ultra-thin-client and the server is large, the latency can be unacceptably large, which can render the ultra-thin-client useless.

Moreover, in such scenarios, the latency is mainly due to the propagation delay, which is a result of the finite velocity of light. Hence, in such scenarios, the propagation delay, and hence the latency, cannot be reduced by simply increasing the bandwidth.

SUMMARY

One embodiment of the present invention provides a system that supports low-latency session-mobility for an ultra-thin-client. During system operation, an ultra-thin-client sends a location-identifier to a Connection Assignment Server (CAS), which facilitates communication with a user-interface (UI) server, wherein the location-identifier specifies the current location of the ultra-thin-client. Next, the ultra-thin-client receives the address of a local UI-server from the CAS, wherein the CAS selects the local UI-server based on the location-identifier. The ultra-thin-client then sends a user-session identifier to the local UI-server. This allows the local UI-server to retrieve a user-session-image for a user-session from a user-session-image repository. Note that, before moving to the current location, the ultra-thin-client was previously communicating with a remote UI-server, which stored the user-session-image in the user-session-image repository. Next, the ultra-thin-client establishes a user-session connection with the local UI-server. In this way, the system enables the ultra-thin-client to resume the user-session through the local UI-server. Note that the system reduces the delay experienced by the user because it enables the ultra-thin-client to carry on the user-session with the local UI-server instead of the remote UI-server.

In a variation on this embodiment, the CAS receives the location-identifier from the ultra-thin-client. Next, the CAS selects a local UI-server based on the location-identifier. The CAS then sends the address of the selected local UI-server to the ultra-thin-client. This enables the ultra-thin-client to establish a user-session with the local UI-server.

In a further variation on this embodiment, the CAS selects the local UI-server by first identifying the continent within which the ultra-thin-client is located. Note that the CAS uses the location-identifier to identify the continent. Next, the CAS selects the local UI-server on the identified continent.

In a variation on this embodiment, the remote UI-server receives a request to store the user-session-image for a user-session. The remote UI-server then creates a user-session-image for the user-session. Next, the UI-server stores the user-session-image in a user-session-image repository. Note that this allows a user to resume the user-session by retrieving the user-session-image at a later time.

In a further variation on this embodiment, creating the user-session-image for the user-session involves creating a checkpointed image of the desktop.

In a variation on this embodiment, the location-identifier of the ultra-thin-client can include an Internet Protocol (IP) address of the ultra-thin-client.

In a variation on this embodiment, the ultra-thin-client is comprised of a display, a keyboard, a mouse, a microphone, a speaker, and a smart-card reader.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs). Transmission medium used in the system may include a communications network, such as the Internet.

Low-Latency Ultra-Thin-Client Infrastructure

Figure 1:
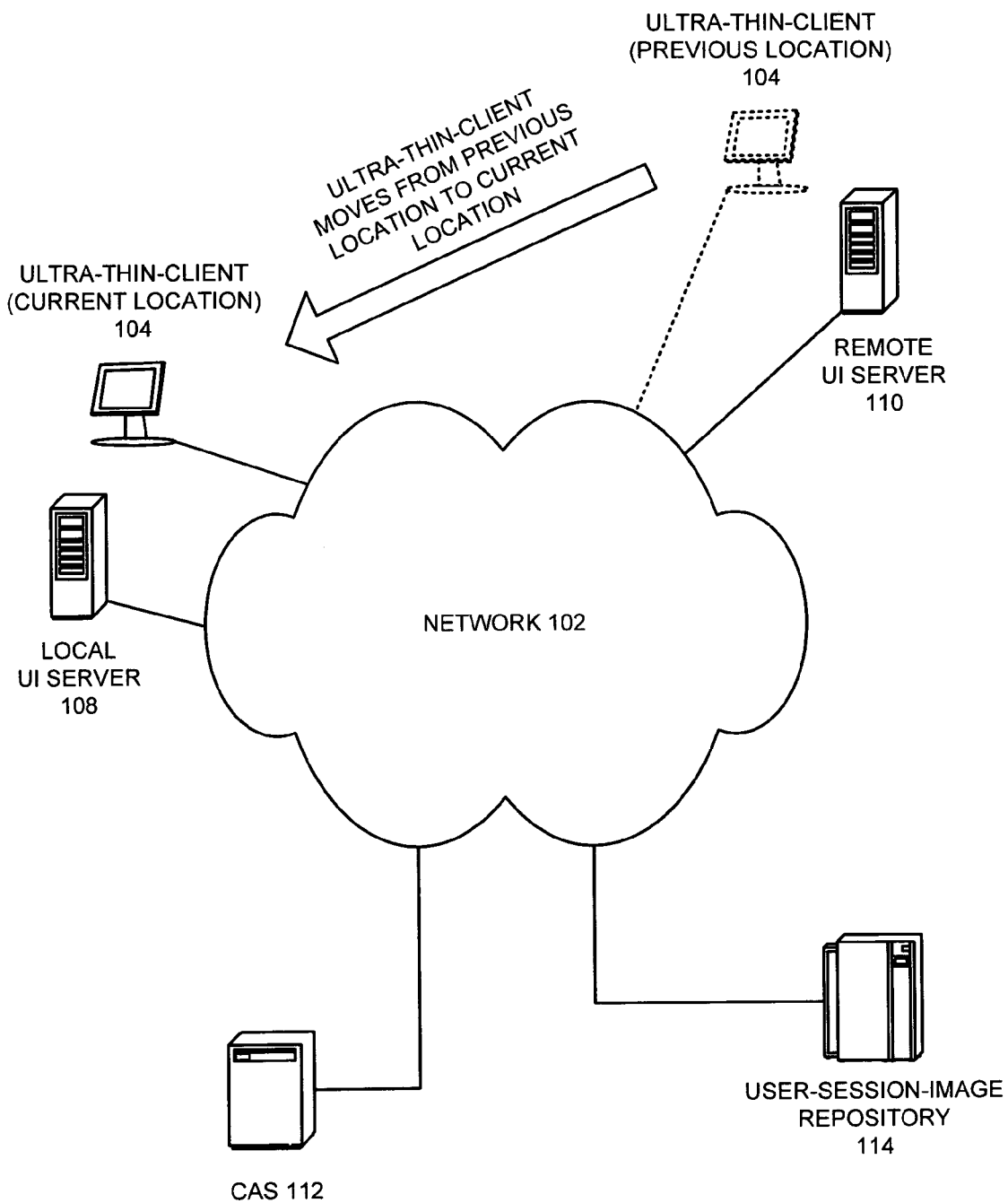
FIG. 1 illustrates a low-latency ultra-thin-client infrastructure that comprises a network that is coupled with an ultra-thin-client, a local user-interface (UI) server, a remote UI-server, a Connection Assignment Server (CAS), and a user-session-image repository in accordance with an embodiment of the present invention.

FIG. 1 illustrates a low-latency ultra-thin-client infrastructure that comprises a network 102 that is coupled with an ultra-thin client 104, a local user-interface (UI) server 108, a remote UI-server 110, a Connection Assignment Server (CAS) 112, and a user-session-image repository 114 in accordance with an embodiment of the present invention.

Network 102 can generally include any type of wired or wireless communication channel capable of coupling together a plurality of communication devices. This includes, but is not limited to, a local area network, a wide area network, or a combination of networks. In one embodiment of the present invention, network 102 includes a UMTS (Universal Mobile Telecommunications System) network. In one embodiment of the present invention, network 102 includes the Internet.

Ultra-thin-client 104 can generally include any type of communication device capable of communicating with other network nodes via a network. This includes, but is not limited to, a computer system based on a microprocessor, a video camera, a Personal Digital Assistant (PDA), a personal organizer, a laptop computer, or a mobile phone. In one embodiment of the present invention, ultra-thin-client 104 comprises a display, a keyboard, a mouse, a microphone, a speaker, and a smart-card reader.

In one embodiment of the present invention, the ultra-thin-client 104 is a PDA. Typically, a user cannot run computationally intensive applications on a PDA due to the limited amount of resources available on the PDA. But, when a PDA is used as an ultra-thin-client, a user can run computationally intensive applications, because now, these applications run on a server instead of running directly on the resource-constrained PDA.

Note that, in FIG. 1, the ultra-thin-client 104 is illustrated at its previous location using dotted lines. The ultra-thin-client 104 subsequently moves to its current location, which is illustrated using solid lines. In one embodiment of the present invention the current location of the ultra-thin-client 104 is in a different continent from its previous location.

In one embodiment of the present invention, an ultra-thin-client, such as ultra-thin-client 104, communicates in a very limited fashion with a UI-server, such as the local UI-server 108. Specifically, in one embodiment of the present invention, the ultra-thin-client 104 only sends user-input data, such as keystrokes, mouse clicks, sound input, etc. to the local UI-server 108. Furthermore, in one embodiment of the present invention, the local UI server 108 only sends screen contents and sound output to the ultra-thin-client 104.

Additionally, in one embodiment of the present invention, a UI-server, such as local UI-server 108, communicates with a plurality of ultra-thin-clients. Furthermore, in one embodiment of the present invention, a UI-server, such as local UI-server 108 is part of a UI-server farm that comprises a plurality of UI-servers.

In one embodiment of the present invention, the local UI-server 108 is on the same continent as the ultra-thin-client 104, whereas the remote UI-server 110 is on a different continent.

The connection assignment server (CAS) 112 facilitates communication between an ultra-thin-client, such as ultra-thin-client 104, and a UI-server, such as UI-server 108. In one embodiment of the present invention, there is at least one CAS on each continent.

The user-session-image repository 114 enables a UI-server, such as remote UI-server 110, to interrupt a user session and store its image in the user-session-image repository 114. This allows a user to resume the user-session by retrieving the user-session-image at a later time. Note that, the user-session-image may be retrieved by another UI-server, such as local UI-server 108.

In one embodiment of the present invention, the user-session-image repository is implemented using a federated database system, which is a collection of cooperating database systems that are autonomous and possibly heterogeneous.

Furthermore, in one embodiment of the present invention, a UI-server, such as remote UI-server 110, directly sends the user-session-image to another UI-server, such as local UI-server 108.

Process for Resuming an Interrupted User Session

Figure 2:
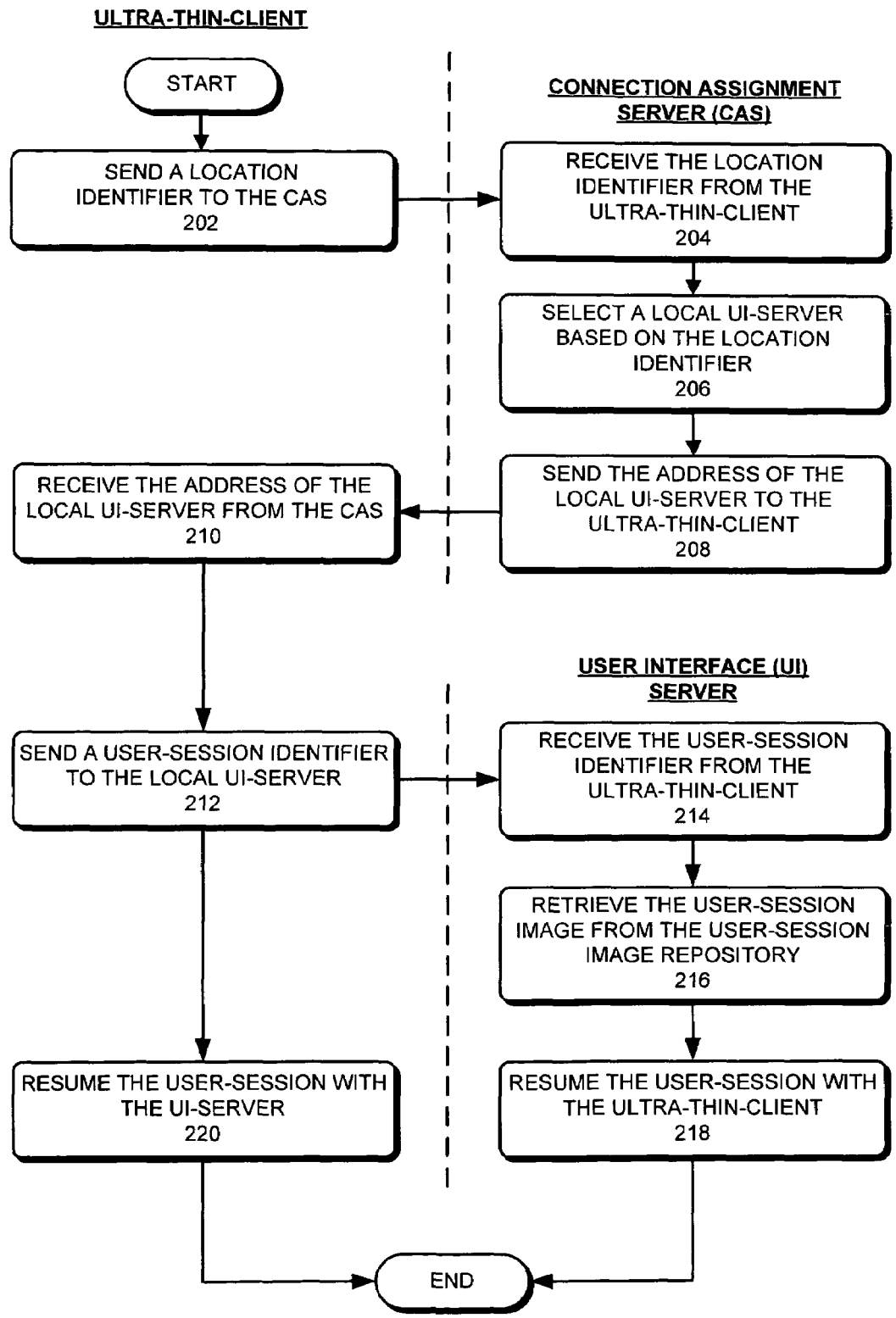
FIG. 2 presents a flowchart that illustrates the process for resuming a user-session through a local UI-server in accordance with an embodiment of the present invention.
Figure 3:
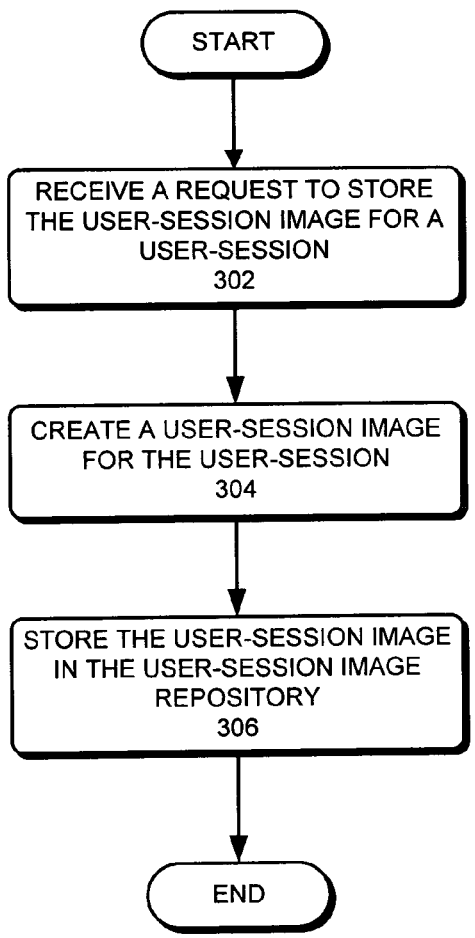
FIG. 3 presents a flowchart that illustrates the process of storing a user-session image in a user-session image repository in accordance with an embodiment of the present invention.
Figure 4:
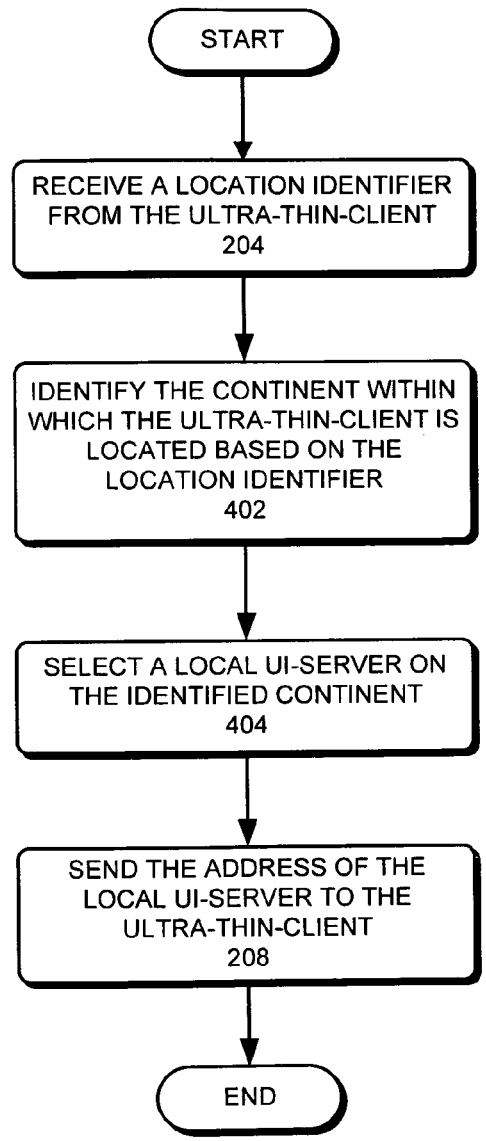
FIG. 4 presents a flowchart that illustrates the process of selecting a local UI-server in accordance with an embodiment of the present invention.

FIG. 2 presents a flowchart that illustrates the process for resuming a user-session through a UI-server, such as local UI-server 108, in accordance with an embodiment of the present invention.

The process starts by an ultra-thin-client, such as ultra-thin-client 104, sending a location identifier to a CAS, such as CAS 112 (step 202).

In one embodiment of the present invention, the location-identifier includes an Internet Protocol (IP) address of the ultra-thin-client 104. Note that the location-identifier may also include a telephone number, which can be used to identify the location of the ultra-thin-client 104.

In another embodiment of the present invention, the user of the ultra-thin-client 104 is prompted to enter the current location of the ultra-thin-client 104. For example, the user may be prompted to enter the name of the city and the country. In yet another embodiment of the present invention, the location-identifier is created using the global positioning system (GPS).

Note that, the location identifier only needs to specify the approximate location of the ultra-thin-client 104. For example, in one embodiment of the present invention, the location identifier specifies the location of the ultra-thin-client 104 within a thousand mile radius.

Next, the CAS 112 receives the location-identifier from the ultra-thin-client 104 (step 204).

The CAS 112 then selects a local UI-server based on the location identifier (step 206). It will be evident to one skilled in the art that the CAS can use a variety of techniques to select the local UI-server based on the location-identifier. For example, in one embodiment of the present invention, the CAS selects the local UI-server 108 that is geographically closest to the ultra-thin-client 104.

Next, the CAS 112 sends the address of the local UI-server 108 to the ultra-thin-client 104 (step 208).

The ultra-thin-client 104 then receives the address of the local UI-server 108 from the CAS 112 (step 210).

Next, the ultra-thin-client 104 sends a user-session identifier to the local UI-server 108 (step 212).

The local UI-server 108 then receives the user-session identifier from the local UI-server 108 (step 214).

Next, the local UI-server 108 uses the user-session identifier to retrieve the user-session-image from the user-session-image repository 114 (step 216).

Finally, the ultra-thin-client 104 and the local UI-server 108 resume the user session (steps 218 and 220).

Process for Storing a User-Session Image

The process starts by receiving a request at a UI-server, such as remote UI-server 110, to store the user-session image of a user session (step 302).

Next, the remote UI-server creates a user-session image of the user session (step 304). In one embodiment of the present invention, creating the user-session-image for the user-session involves creating checkpointed images of one or more user-processes. In one embodiment of the present invention, creating the user-session-image for the user-session involves creating a desktop checkpoint.

Finally, the system stores the user-session image in the user-session-image repository (step 306). Note that, the stored user-session image can be retrieved by a UI-server, such as local UI-server 108, at a later time.

Note that that user-session-image repository facilitates the migration of a user-session image from one UI-server to another UI-server. It will be evident to one skilled in the art that this functionality can be achieved using a variety of techniques. For example, in one embodiment of the present invention, a UI-server, such as remote UI-server 110, directly sends the user-session-image to another UI-server, such as local UI-server 108.

Process for Selecting a Local UI-Server

The process starts by receiving the location identifier at the CAS 112 from the ultra-thin-client 104 (step 204).

Next, the CAS 112 identifies the continent within which the ultra-thin-client 104 is located based on the location identifier (step 402).

It will be apparent to one skilled in the art that a variety of techniques can be used to identify the continent based on the location identifier.

For example, suppose that the location identifier includes a public IP address of the ultra-thin-client 104. In one embodiment of the present invention, the postal address of the registered owner of the public IP address is used to identify the continent of the ultra-thin-client 104. Furthermore, in one embodiment of the present invention, the continent is identified by finding the Regional Internet Registry that owns the public IP address of the ultra-thin-client 104.

The CAS 112 then selects a UI-server, such as local UI-server 108, in the identified continent (step 404). Note that, in one embodiment of the present invention, the local UI-server 108 belongs to a server farm that contains a plurality of UI-servers. Furthermore, it will be evident to one skilled in the art that variety of techniques can be used to select a UI-server on the identified continent. For example, in one embodiment of the present invention, the least loaded UI-server on the identified continent is selected.

Finally, the CAS 112 sends the address of the selected UI-server, such as local UI-server 108, to the ultra-thin-client 104 (step 208).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for supporting low-latency session-mobility over large distances for an ultra-thin-client, the method comprising:

sending a location-identifier that specifies the current geographic location of the ultra-thin-client to a Connection Assignment Server (CAS), which facilitates communication with user-interface (UI) servers, wherein a user uses the ultra-thin-client to interact with a remote application which does not execute on the ultra-thin-client, wherein the ultra-thin-client sends the user's input to a UI server, and wherein the ultra-thin-client receives screen content from the UI server which is generated by the remote application in response to the user's input;

receiving the address of a local UI-server from the CAS, wherein the CAS selects the local UI-server based on the location-identifier;

sending a user-session identifier to the local UI-server, thereby allowing the local UI-server to retrieve a user-session-image for an interrupted user-session from a user-session-image repository, wherein before moving to the current location, the ultra-thin-client was communicating with a remote UI-server, which stored the user-session-image in the user-session-image repository; and resuming the interrupted user-session with the local UI-server;

wherein by communicating with the local UI-server instead of the remote UI-server reduces the delay experienced by the user while using the ultra-thin-client.

2. The method of claim 1, further comprising:

receiving the location-identifier of the ultra-thin-client at the CAS;

selecting a local UI-server based on the location-identifier; and sending the address of the selected local UI-server to the ultra-thin-client, thereby enabling the ultra-thin-client to establish a user-session with the local UI-server.

3. The method of claim 2, wherein selecting the local UI-server based on the location-identifier involves:

identifying the continent within which the ultra-thin-client is located based on the location-identifier; and selecting the local UI-server on the identified continent.

4. The method of claim 1, further comprising:

receiving the user-session identifier from the ultra-thin-client;

retrieving a user-session image from a user-session-image repository based on the user-session identifier; and using the user-session-image to resume the interrupted user-session with the ultra-thin-client.

5. The method of claim 1, further comprising:

receiving a request at the remote UI-server to store the user-session-image for a user-session;

creating a user-session-image for the user-session; and storing the user-session-image in a user-session-image repository, thereby allowing a user to resume the user-session by retrieving the user-session-image at a later time.

6. The method of claim 5, wherein creating the user-session-image for the user-session involves creating a desktop checkpoint.

7. The method of claim 1, wherein the location-identifier of the ultra-thin-client can include an Internet Protocol (IP) address of the ultra-thin-client.

8. The method of claim 1, wherein the ultra-thin-client is comprised of:
- a display;
- a keyboard;
- a mouse;
- a microphone;
- a speaker; and
- a smart-card reader.

9. A computer-readable storage medium storing instructions that when executed by a computer cause the computer to perform a method for supporting low-latency session-mobility over large distances for an ultra-thin-client, wherein the computer-readable storage medium does not include instruction signals embodied in a transmission medium, the method comprising:

sending a location-identifier that specifies the current geographic location of the ultra-thin-client to a Connection Assignment Server (CAS), which facilitates communication with user-interface (UI) servers, wherein a user uses the ultra-thin-client to interact with a remote application which does not execute on the ultra-thin-client, wherein the ultra-thin-client sends the user's input to a UI server, and wherein the ultra-thin-client receives screen content from the UI server which is generated by the remote application in response to the user's input;

receiving the address of a local UI-server from the CAS, wherein the CAS selects the local UI-server based on the location-identifier;

sending a user-session identifier to the local UI-server, thereby allowing the local UI-server to retrieve a user-session-image for an interrupted user-session from a user-session-image repository, wherein before moving to the current location, the ultra-thin-client was communicating with a remote UI-server, which stored the user-session-image in the user-session-image repository; and resuming the interrupted user-session with the local UI-server;

wherein by communicating with the local UI-server instead of the remote UI-server reduces the delay experienced by the user while using the ultra-thin-client.

10. The computer-readable storage medium of claim 9, further comprising:

receiving the location-identifier of the ultra-thin-client at the CAS;

selecting a local UI-server based on the location-identifier; and sending the address of the selected local UI-server to the ultra-thin-client, thereby enabling the ultra-thin-client to establish a user-session with the local UI-server.

11. The computer-readable storage medium of claim 10, wherein selecting the local UI-server based on the location-identifier involves:

identifying the continent within which the ultra-thin-client is located based on the location-identifier; and selecting the local UI-server on the identified continent.

12. The computer-readable storage medium of claim 9, further comprising:

receiving the user-session identifier from the ultra-thin-client;

retrieving a user-session image from a user-session-image repository based on the user-session identifier; and using the user-session-image to resume the interrupted user-session with the ultra-thin-client.

13. The computer-readable storage medium of claim 9, further comprising:

receiving a request at the remote UI-server to store the user-session-image for a user-session;

creating a user-session-image for the user-session; and storing the user-session-image in a user-session-image repository, thereby allowing a user to resume the user-session by retrieving the user-session-image at a later time.

14. The computer-readable storage medium of claim 13, wherein creating the user-session-image for the user-session involves creating a desktop checkpoint.

15. The computer-readable storage medium of claim 9, wherein the location-identifier of the ultra-thin-client can include an Internet Protocol (IP) address of the ultra-thin-client.

16. The computer-readable storage medium of claim 9, wherein the ultra-thin-client is comprised of:
- a display;
- a keyboard;
- a mouse;
- a microphone;
- a speaker; and
- a smart-card reader.

17. An apparatus for supporting low-latency session-mobility over large distances for an ultra-thin-client, the apparatus comprising:

a location-sending mechanism configured to send a location-identifier that specifies the current geographic location of the ultra-thin-client to a Connection Assignment Server (CAS), which facilitates communication with user-interface (UI) servers, wherein a user uses the ultra-thin-client to interact with a remote application which does not execute on the ultra-thin-client, wherein the ultra-thin-client sends the user's input to a UI server, and wherein the ultra-thin-client receives screen content from the UI server which is generated by the remote application in response to the user's input;

an address-receiving mechanism configured to receive the address of a local UI-server from the CAS, wherein the CAS selects the local UI-server based on the location-identifier;

an identifier-sending mechanism configured to send a user-session identifier to the local UI-server, thereby allowing the local UI-server to retrieve a user-session-image for an interrupted user-session from a user-session-image repository, wherein before moving to the current location, the ultra-thin-client was communicating with a remote UI-server, which stored the user-session-image in the user-session-image repository; and a resuming mechanism configured to resume the interrupted user-session with the local UI-server;
wherein by communicating with the local UI-server instead of the remote UI-server reduces the delay experienced by the user while using the ultra-thin-client.

18. The apparatus of claim 17, further comprising:
a location-receiving mechanism configured to receive the location-identifier of the ultra-thin-client at the CAS;
a selecting mechanism configured to select a local UI-server based on the location-identifier; and
a address-sending mechanism configured to send the address of the selected local UI-server to the ultra-thin-client, thereby enabling the ultra-thin-client to establish a user-session with the local UI-server.

19. The apparatus of claim 18, wherein the selecting mechanism includes:
an identifying mechanism configured to identify the continent within which the ultra-thin-client is located based on the location-identifier; and
a second selecting mechanism configured to select the local UI-server on the identified continent.

20. The apparatus of claim 17, further comprising:
an identifier-receiving mechanism configured to receive the user-session identifier from the ultra-thin-client;
a retrieving mechanism configured to retrieve a user-session image from a user-session-image repository based on the user-session identifier; and
a resuming mechanism configured to use the user-session-image to resume the interrupted user-session with the ultra-thin-client.

21. The apparatus of claim 17, further comprising:
a request-receiving mechanism configured to receive a request at the remote UI-server to store the user-session-image for a user-session;
a creating mechanism configured to create a user-session-image for the user-session; and
a storing mechanism configured to store the user-session-image in a user-session-image repository, thereby allowing a user to resume the user-session by retrieving the user-session-image at a later time.

22. The apparatus of claim 21, wherein the creating mechanism is further configured to create a desktop checkpoint.

23. The apparatus of claim 17, wherein the location-identifier of the ultra-thin-client can include an Internet Protocol (IP) address of the ultra-thin-client.

24. The apparatus of claim 17, wherein the ultra-thin-client is comprised of:
a display;
a keyboard;
a mouse;
a microphone;
a speaker; and
a smart-card reader.

* * * * *